United States Patent
Medley

[11] 3,892,939
[45] July 1, 1975

[54] WELDING MACHINE

[75] Inventor: Victor James Medley, Brookvale, New South Wales, Australia

[73] Assignee: P.M. Andersen Manufacturing Pty. Limited, Brookvale, Australia

[22] Filed: Apr. 25, 1974

[21] Appl. No.: 464,160

[30] Foreign Application Priority Data
Oct. 18, 1973 Australia............................ 5296/73

[52] U.S. Cl. .................. 219/101; 29/160; 219/57; 228/44
[51] Int. Cl. ............................................ B23k 11/02
[58] Field of Search ............ 29/160; 219/56, 57, 58, 219/101, 104, 107; 228/44

[56] References Cited
UNITED STATES PATENTS

| | | | |
|---|---|---|---|
| 1,311,789 | 7/1919 | Abbott | 219/101 |
| 2,179,803 | 11/1939 | Sykes | 219/107 X |
| 2,384,303 | 9/1945 | Heath | 219/58 X |
| 3,056,883 | 10/1962 | Eisenburger et al. | 219/107 X |
| 3,162,744 | 12/1964 | Stern et al. | 219/89 X |

Primary Examiner—J. V. Truhe
Assistant Examiner—N. D. Herkamp
Attorney, Agent, or Firm—Oldham & Oldham

[57] ABSTRACT

This invention relates to a resistance welding machine which is useful for welding an end bar to the ends of the longitudinal members of a metal grating, the machine having a carriage having on it a welding transformer, a vertically movable first welding electrode arranged to engage the longitudinal members to be welded, and a horizontally movable second electrode arranged to drive the end bar into welding engagement with an end of a longitudinal member to be welded, a vertically positioned fluid actuating cylinder carrying the first electrode thereon and arranged to drive it into firm engagement with a longitudinal member, and a welding head carried by the carriage but coupled to the second electrode by means of a linkage so that the welding head is not interfered with by the jumper leads which connect the electrodes to the transformer.

14 Claims, 10 Drawing Figures

Fig. 8

WELDING MACHINE

Welding apparatus similar to that of the present invention is disclosed in co-pending U.S. Pat. application Ser. No. 448,512 by Peter John Andersen.

This invention relates to a welding machine which is suitable for welding end bars to the ends of the longitudinal bars of a metal grating, the machine being used for welding gratings either of steel or aluminium.

BACKGROUND OF THE INVENTION

In many instances it is necessary to weld end bars to the ends of longitudinal members of metal gratings, and heretofore it has been carried out with steel grating by the arc welding process. This process is slow and is not very suitable for use with aluminium. There is therefore a dual reason to provide a machine which is capable of welding either steel or aluminium, and which is capable of welding at a relatively high speed so that it is suitable for use in a production line.

If a machine is to be suitable for achieving difficult welds, for example aluminium, it is desirable that the secondary loop be of simple geometric configuration and as small as possible, but in welding an end bar to the ends of the longitudinal members of the grating it will be seen that there is a need for the direction of movement of the two electrodes, that is the electrodes which contacts the longitudinal members and the electrode which contacts the end bar, to be at right angles with one another. Thus the standard arrangement for welding is unsuitable for the reason that the welding electrode is likely to interfere with the jumper leads between the transformer and the electrodes.

MAIN OBJECTS OF THE INVENTION

The main object of the invention is to provide a welding machine which is capable of welding an end bar to the ends of the longitudinal members of a metal grating, whether the end bar be steel or aluminium.

The secondary object is to provide improvements to a welding machine whereby the welding head may be positioned out of alignment with the main electrode of the machine but coupled thereto in such a way as to still enable a high speed follow-up to occur upon collapse of the welding bead.

BRIEF SUMMARY OF THE INVENTION

Briefly the invention comprises clamps for clamping a grating to a grating support platen with the ends of the longitudinal members projecting therefrom, an edge bar support arranged to support an edge bar contiguous with the ends to be welded, a carriage guided for movement by rails and carrying on it a welding transformer, a main welding head, a first welding electrode for successive engagement with each longitudinal member of the grating, a second welding electrode for engagement against the edge bar, and linkage means interconnecting the head with the second welding electrode. This then enables the welding head to be out of alignment with the central vertical plane of the welding transformer, but the linkage means may comprise relatively low inertia members so that the second welding electrode is able to maintain pressure on the weld metal during the follow-up period.

More specifically the invention consists of a welding machine which comprises:

a base, a grating support platen on the base, a fluid actuated clamp on the base co-operating with the platen for clamping the grating thereto, an edge bar support on the base, a pair of rails fixed relative to the base but spaced therefrom, the rails being parallel to an edge of the platen, a carriage, wheels on the carriage engaging and guided for movement by the rails, power operated drive means coupled to said wheels, a welding transformer on the carriage having a pair of secondary terminals thereon, a pressure fluid actuated electrode cylinder on the carriage positioned above the plane of the platen, a first welding electrode coupled to the movable element of electrode cylinder, a pressure fluid actuated welding head on the carriage, a horizontally movable second welding electrode, linkage means coupling the welding head to the second electrode for effecting said horizontal movement thereof upon actuation of the welding head, jumper lead interconnecting the welding electrodes to respective said secondary transformer terminals, motor control means coupled to the power operated drive means for moving the carriage between welding stations, and weld control means coupled to the transformer for controlling energising of the transformer.

BRIEF DESCRIPTION OF THE DRAWINGS

An embodiment of the invention is described hereunder in some detail with reference to and as illustrated in the accompanying drawings in which:

FIG. 8 is a perspective view of the base illustrating a stop bar arrangement for the positioning of a grating and an end bar support for the positioning of an end bar.

DETAILED DESCRIPTION OF THE EMBODIMENT ILLUSTRATED IN THE DRAWINGS

Figure 1:
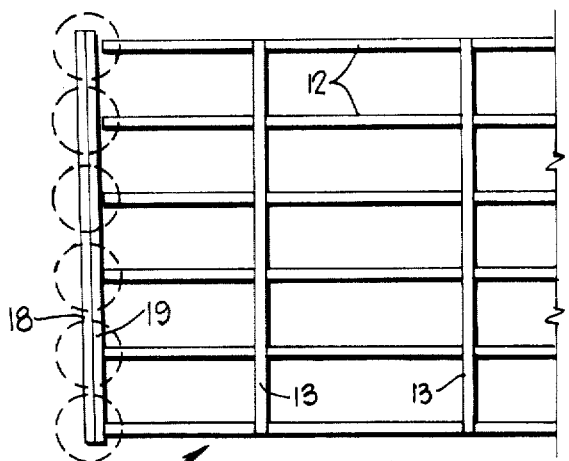
FIG. 1 is a diagrammatic plan illustrating a grating and edge bar about to be welded thereto.

Referring first to the diagrammatic representations of FIGS. 1, 2, 3 and 4, metal grating 11 comprises a plurality of longitudinal members 12 interconnected by cross bars 13, this being in accordance with prior art in the manufacture of steel grating.

The metal grating is supported on a grating support platen 15, and clamps 16 firmly retain it in position.

An end bar 18 to be welded to the projecting ends of the longitudinal members 12 is provided with a pair of welding beads 19 extending along the length of its welding face, each welding bead 19 having converging side faces so that upon a weld taking place the desired heat gradient occurs to retain the metal plastic and in weldable condition.

Figure 2:
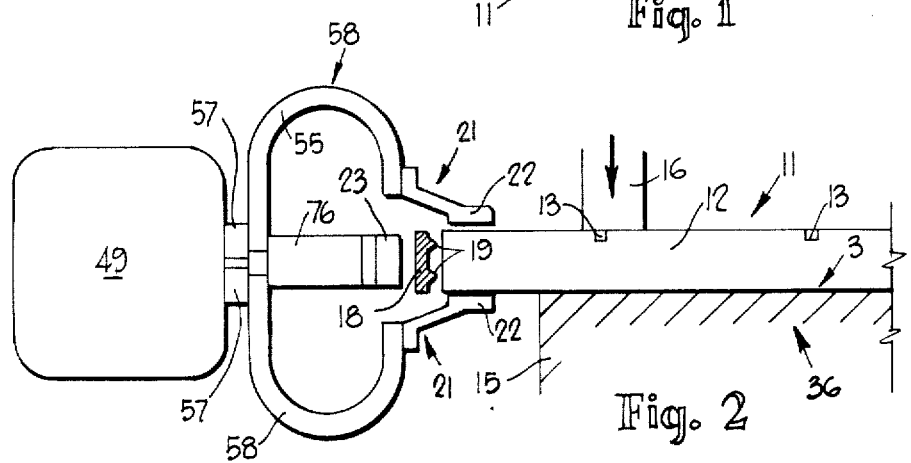
FIG. 2 is a longitudinal section showing the clamping of the grating and the position of the welding electrodes before a weld takes place.
Figure 3:
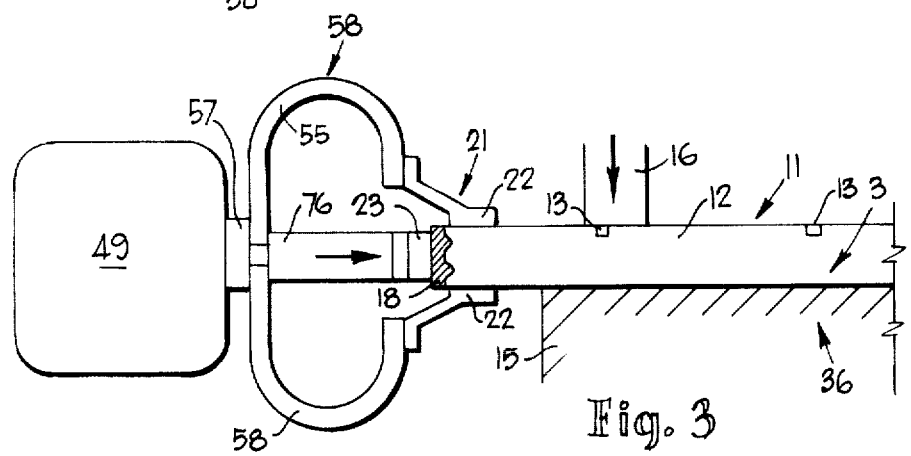
FIG. 3 is a section similar to FIG. 2 but illustrating the condition after the welds have taken place.
Figure 4:
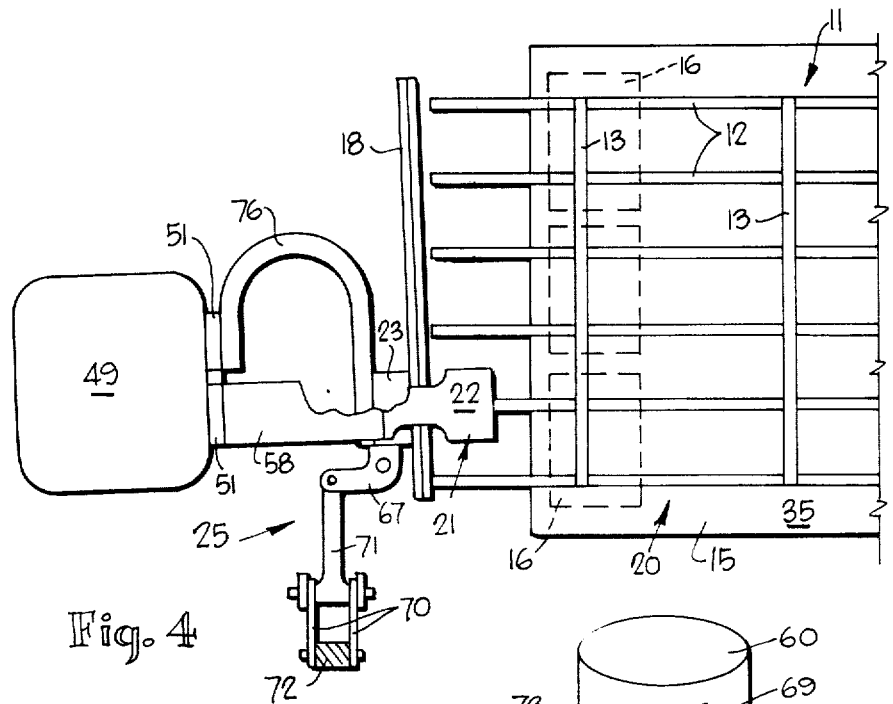
FIG. 4 is a plan of FIG. 3 showing a condition which exists after two only of the welds have taken place.

As shown more particularly in FIGS. 2, 3, and 4, the projecting ends of the longitudinal members 12 are contacted between the members of a first electrode designated generally 21 but comprising a pair of blocks 22 formed from copper alloy, while a second electrode designated 23 is arranged to move in a horizontal plane. This movement is effected by means of a head (illustrated in FIG. 9 and described hereunder) which is coupled to the second electrode 23 by means of a linkage generally designated 25, but the linkage 25 has relatively low inertia so that follow-up pressure is maintained on the weld metal during collapse of the welding beads 19.

As shown in FIG. 4, the end bar 18 is welded to the ends of the longitudinal members 12 successively, and it will be appreciated that as each weld takes place, the collapse of the welding beads 19 necessarily results in some bending of the end bar 18, but as illustrated in FIG. 4, the bends which are formed in the end bar 18 are progressively straightened by successive welds.

FIGS. 5, 6, 7, 8 and 9 illustrate the machine in greater detail.

The machine comprises two basic portions, there being a base designated 28 which has the grating support platen 15 secured thereto, a pair of fixed rails 29, a carriage 30 and wheels 31 which engage the rails 29 and support the carriage 30.

Referring first to the construction of the base 28, it will be seen that it is provided with a bridge member 33 which carries on it a series of fluid actuated cylinders 34, the lower ends of the movable piston rods of which carry clamp pads 35 which engage the outer surfaces of the longitudinal members 12 of the grating 11 when the cylinders 34 are actuated. Sufficient force is imparted to prevent slipping of the grating over the surface of the platen 15 when a weld pressure is applied to an edge bar.

To facilitate loading, the base 28 is provided with a plurality of roll cases designated 37, the upper surfaces of the rolls of which are co-planar with the upper surface of the grating support platen 15.

In order to locate the ends of the longitudinal members, the base 28 is provided with the plurality of stop bars 39 hinged thereto, each stop bar 39 being provided with a lip 40 upstanding at its outer end to engage the longitudinal members. The stop bars are raised by respective pneumatic cylinders 41, but in their raised condition interfere with the travel of the carriage 30 as can be seen for example from FIG. 6, so that the stop bars must be lowered before carriage movement commences.

At an end of the base 28 there is also provided a support bar 43 similar in configuration to the stop bars 39 but extending out by a further amount. The bar 43 is raised by a pneumatic cylinder 44, the bar 43 having also an upstanding lip 45 at its end. The stop bars and support bar are not shown in FIG. 7 for the sake of simplicity. The upstanding lip 45 on the end of support bar 43 is provided with a slidable block 46 spring loaded by a spring 47, and the arrangement is such that an end of an end bar 18, when supported by the arm 43, is able to move in an end-wise direction, its slight movement being accommodated by compression of the spring 47.

The other end of the end bar, that is the end to be first welded, is also supported by the carriage. The carriage 30 has on it two spaced flanged rollers designated 49, each being freely rotatable about its vertical axis, and also a pressure roller designated 50 which is freely rotatable about a horizontal axis. The pressure roller 50 is carried between the arms of a clevis 51, and is urged downwardly by a pressure actuated cylinder 52. Thus the end bar is firmly held prior to the first weld so that the first weld is accurately located, but since there is a danger of distortion of the end bar 18 during welding, the pressure roller 50 is maintained against its upper edge during the welding sequences. The rollers 49 and 50 are not illustrated in FIG. 7.

Figure 7:
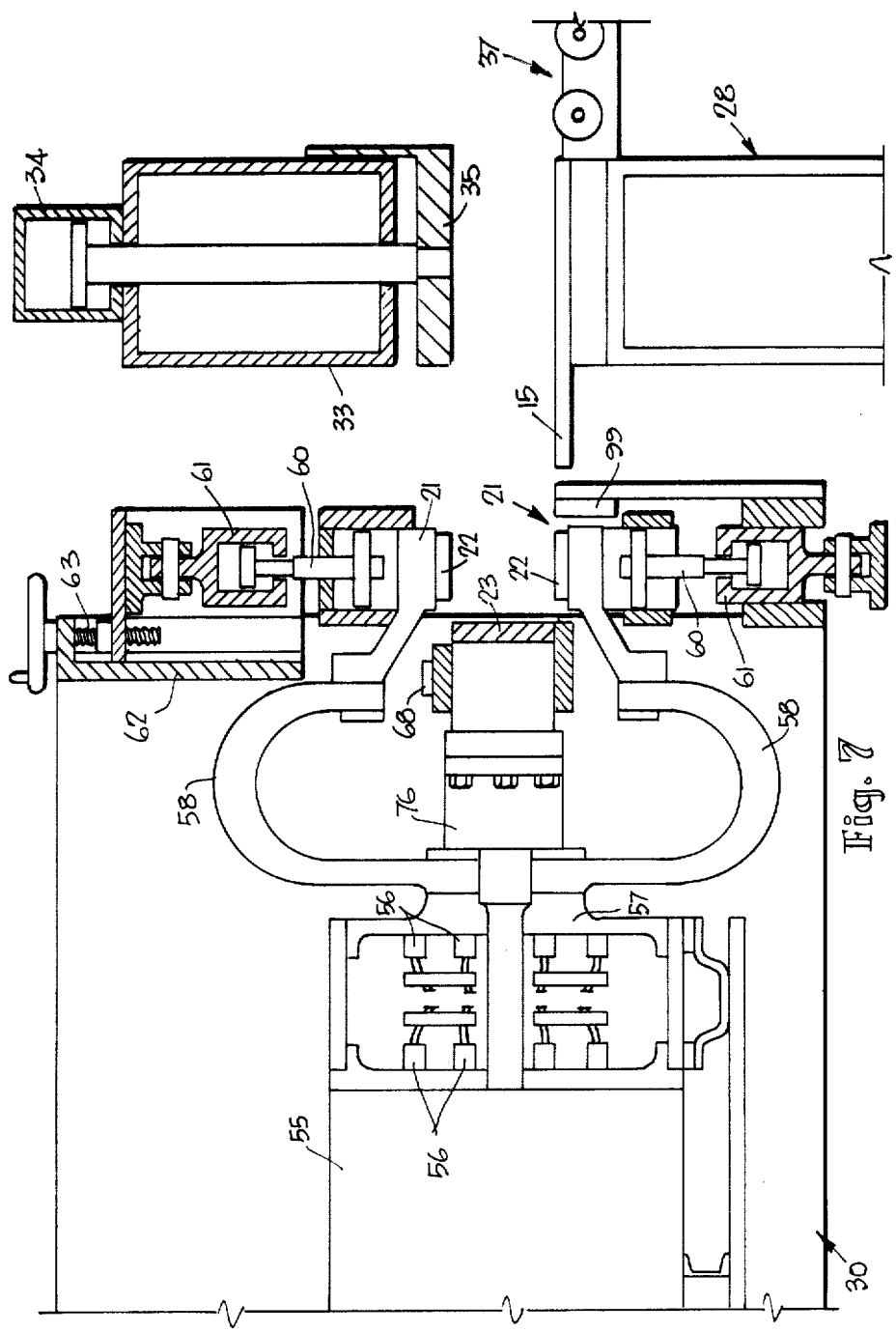
FIG. 7 is a fragmentary but enlarged section taken on line 7—7 of FIG. 5.

As more particularly shown in FIG. 7 the carriage 30 carries on it a welding transformer 55 which can for most purposes be a single phase transformer, but in this embodiment is a three phase transformer being provided with a set of diodes 56. The diodes 56 rectify the transformer three phase current, and the transformer is provided with secondary terminals designated 57, the secondary terminals being side by side.

One secondary terminal is provided with a pair of jumper leads which are symmetrical about the medial horizontal plane of the transformer, the jumper leads being designated 58, being formed on a series of laminations of shim copper, and being connected to a first electrode designated 21. The first electrode 21 comprises two copper alloy blocks 22 as described above. The blocks 22 of the first electrode 21 are respectively carried on the lower ends of the piston rods 60 of respective upper and lower cylinders 61. The upper and lower cylinders 61 are themselves carried on a slide 62 the height of which is variable by means of hand wheel and nut assembly 63 as shown in FIG. 7 so that the medial plane of the first electrode can be raised or lowered.

Figure 9:
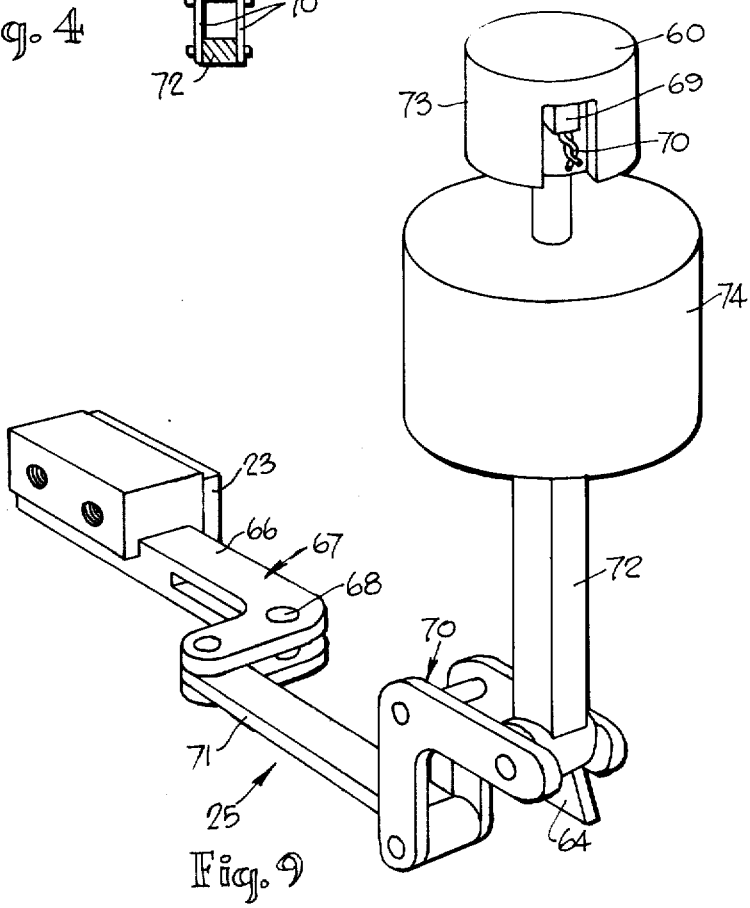
FIG. 9 is a perspective view illustrating the welding head and second electrode (being the electrode which moves in a horizontal plane)
Figure 5:
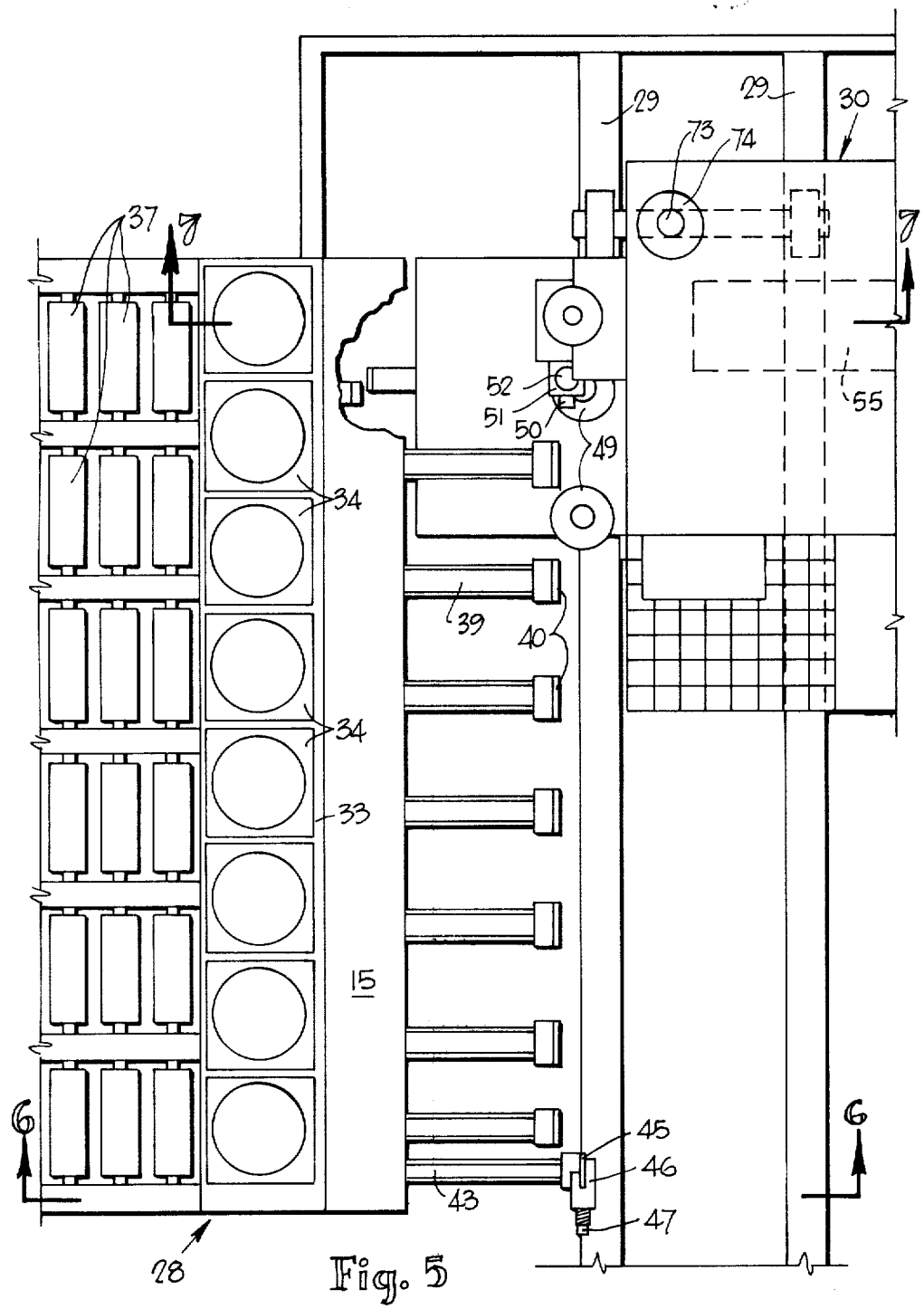
FIG. 5 is a plan view of the welding machine.
Figure 6:
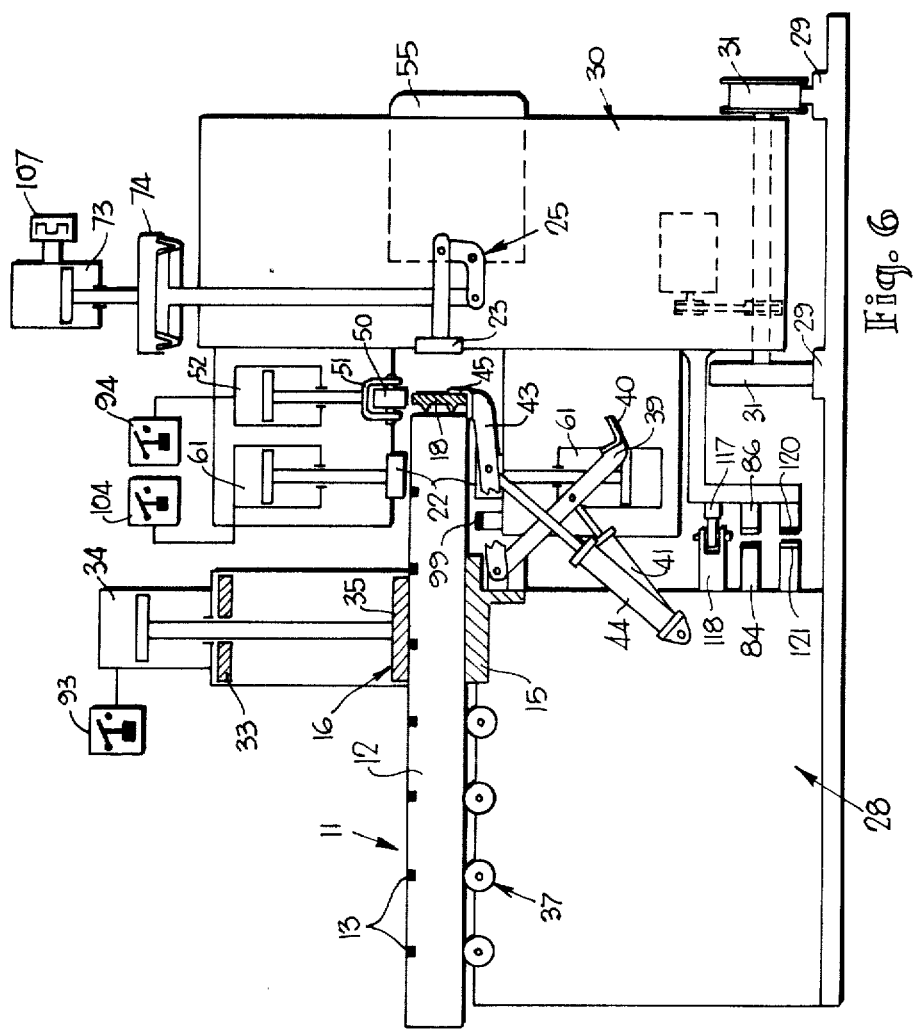
FIG. 6 is a section taken on line 6—6 of FIG. 5.

The first electrodes will be seen to move in a vertical direction, but the second electrode designated 23 is, as shown in FIG. 9, carried on an arm 66 of a bell crank 67 which is pivoted about a pin 68 on the carriage 30, the bell crank being coupled to a second bell crank 70 which lies in a vertical plane, the coupling being effected by a line 71. A thrust rod 72 is coupled to a welding head 73 (constituted by a pressure actuated cylinder) through a pressure transmitter 74, the pressure transmitter being an air bag sold under Trade Mark "SEALOFF" by Taylor, Winfield Corporation of Warren, Ohio, United States of America. The function of the pressure transmitter 74 is to provide a low inertia rapid follow-up for the weld metal as it collapses during a weld. It should be noted that in this respect that the drawing of FIG. 6 is intended to be only diagrammatic in so far as the pressure transmitter 74, welding head 73 and linkage 25 is concerned. The constructional details are shown accurately in FIG. 9.

The second electrode 23 is coupled to its respective secondary terminal 57 of the transformer 55 by means f a horizontally disposed jumper lead designated 76 of similar construction to the jumper leads 58, and it will be seen that the two jumper leads 58 define with the jumper leads 76 two secondary loops which are of identical shape and size so that weld variations in the beads of the end bar 18 are maintained at a minimum during the welding cycle.

Reference is now made to the means of effecting control of the various stages in the use of the machine.

Figure 8:
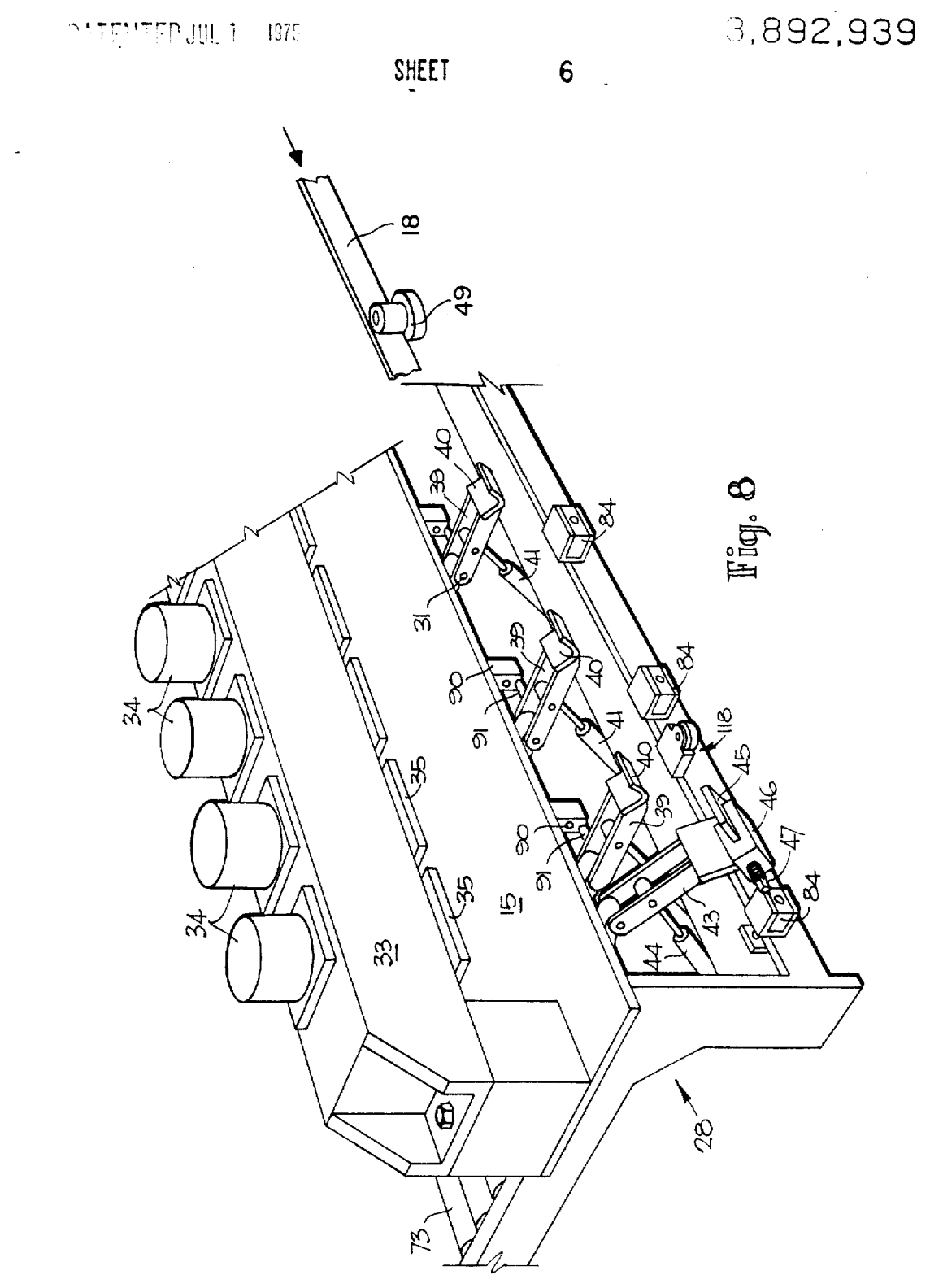
Figure 10:
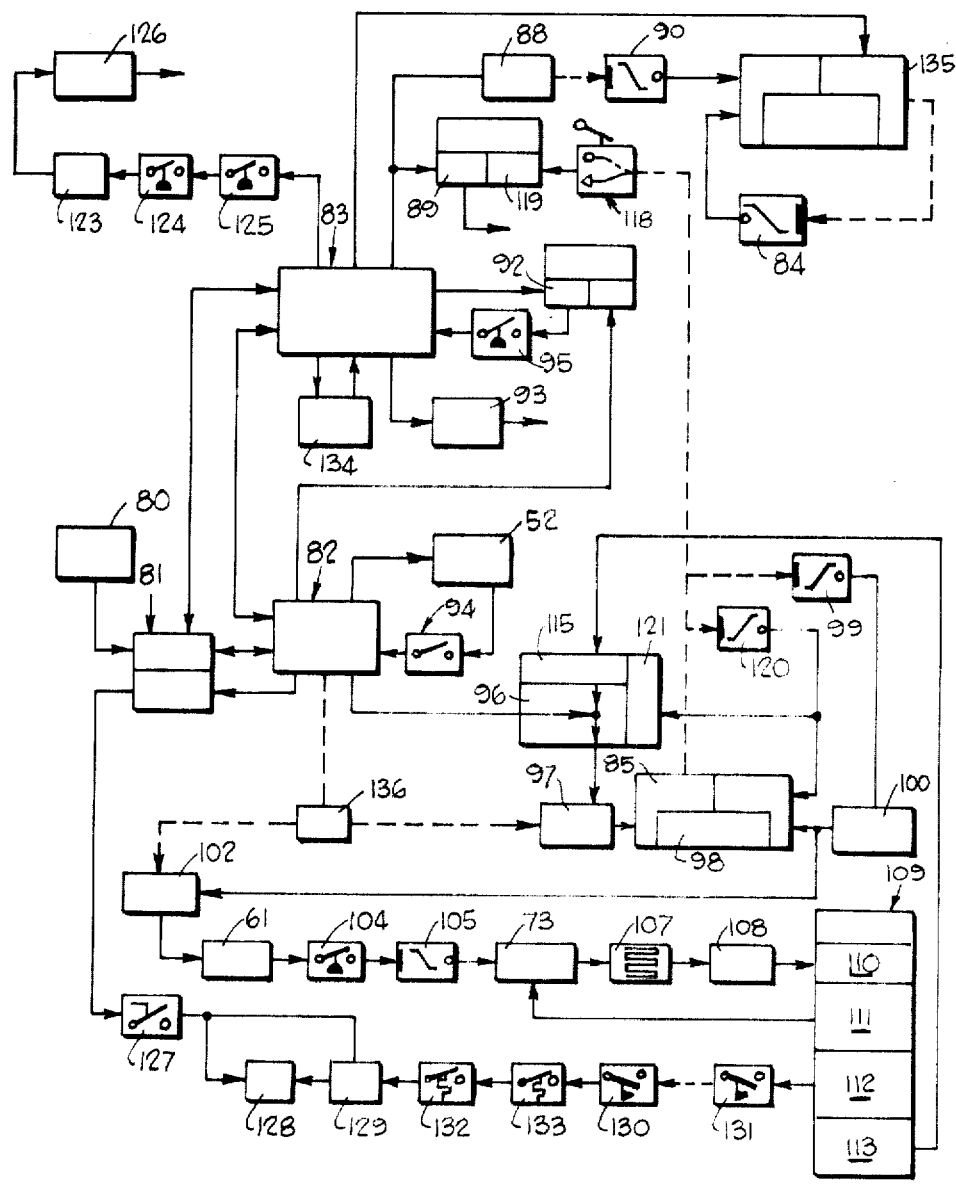
FIG. 10 is a machine sequence block diagram.

In considering the sequences and the control, reference should be had primarily to FIG. 10, but FIGS. 6, 7 and 8 illustrate some of the control means which are used in the control circuit.

In FIG. 10, the designation 80 indicates a main electrical supply and the designation 81 a main supply distribution console and contactor. 82 designates an automatic operator's control panel and 83 a manual operator's control panel.

The manual operator's control panel is provided with means (not shown) which switches in a number of proximity detectors designated 84 in FIGS. 6 and 8. A carriage return is initiated at 85 (FIG. 10) and the carriage returns until the relevant proximity detector 84 detects its position (by having a shoe 86 moved to become contiguous with it, the shoe 86 being on the carriage 30). This is illustrated best in FIG. 6. The relevant proximity detector 84 is switched in by a switch on the manual operator's panel, and is selected to provide a carriage return travel slightly greater than the width of the grating to which the end bar is to be welded.

When the carriage has completed its return movement, the "stop bar up" and "end bar support up" controls 88 and 89 respectively are operated, and the stop bars and edge bar support are caused to ascend under the influence of the cylinders 41 and 44 respectively. As the stop bars rise, the stop bar detectors 90 come under the influence of bosses 91 on stop bars (FIG. 8) and this inhibits carriage movement in a forwad direction. Without this provision a danger would exist of the carriage moving against the stop bars and damaging them.

At this time, the grating is loaded, the ends of the grating longitudinal members being positioned by the lips 40 on the stop bars 39. The "clamp on" control 92 is initiated and this causes the actuation of the clamp cylinders 34 and the descent of the clamp pads 35, thereby firmly clamping the grating to the platen 15. This causes closure of the pressure switch 95 shown on FIGS. 6 and 10.

When the sequence is an automatic sequence, the manual control selector is switched to an automatic position whereby the stop bars then descend, and the detectors 90 are no longer under the influence of bosses 91. When the stop bars have all descended, the end bar 18 is loaded, being positioned on the flanges of the rollers 49 at one end and being positioned on the support bar 43 at the other. The automatic operator's control 82 is then initiated to operate the hold down roller cylinder 52 causing the hold down roller 50 to apply a downward force against the stop bar 18 and retain it against the flanges of the rollers 49. As pressure builds up, the pressure switch 94 closes. The automatic cycle start is then initiated, this being designated 96 is FIG. 10. The index cycle 97 then commences and the following sequences take place automatically:

a. Carriage moves forward (98 in FIG. 10), b. detector 99 (FIGS. 6, 8 and 10) counts the number of longitudinal members of the grating (which can be one, two or four members of which one is usually selected), c. at the end of the index count, designated 100 in FIG. 10, the carriage stops, d. the index cycle is then completed, index cycle being designated 97 in FIG. 10.

The weld cycle designated 102 in FIG. 10 then commences. Firstly the cylinders 61 are actuated to close the blocks 22 of the first electrode 21 against the upper and lower surfaces of the longitudinal members 12 which are to be welded. The pressure switch 104 is closed (FIGS. 6 and 10) and the second electrode 23 caused to advance by actuation of the welding head 73. The detector 105 (shown only in FIG. 10) prevents the advancement of the front electrode (actuation of the welding head 73) if excess movement occurs of the electrode 22, such movement indicating absence of the grating.

As pressure is imparted to the welding head 73, a strain gauge 107 (FIGS. 6, 9 and 10) drives a strain gauge transmittor 108 to initiate the timer sequence. The timer sequence is generally designated in FIG. 10 as 109 and comprises an initial heat 110, a forging pressure 111, a secondary heat period 112, and terminates at the "end of sequence" 113. At this time the cylinder 61 retracts the electrode blocks 22 from the grating and the welding head 73 is also caused to be retracted. The load cell 107 (strain gauge) is caused to relax, the timer initiation 110 opens, the pressure switch 104 opens, and the welding cycle is then completed. The cycle is recommenced by the re-cycle program 115.

When the welds are nearly all completed, a shoe 117 engages an air valve 118 (FIGS. 6, 8 and 10) which lowers the edge bar support at 119, (FIG. 10). However the sequence will continue until the end of grating detector 120 becomes in the proximity of shoe 121 on the base 28 and the carriage stops (121 on FIG. 10).

At the completion of the automatic cycle, the automatic control selector is switched to a "manual" position, the pressure roller 50 ascends, the pressure switch 94 opens, the clamps ascend, the pressure switch 95 opens, the manual control is switched to manual position, the grating is unloaded, or if necessary reversed and the opposite end is welded.

Should the operator wish to terminate or hold the auto sequence during the progress along the mat, then a "cycle finish" selector is utilised. On initiation (either during the index or the weld sequence) the cycle will finish at the end of the next weld sequence.

The further elements which are disclosed in FIG. 10 are designated as follows:

123 - pump motor,

124 - safety pressure switch for air supply, closing only when air is supplied at pressure.

125 - safety pressure switch for water supply, closing only when water is supplied at pressure.

126 - hydraulic accumulator containing hydraulic fluid at pressure.

127 - main isolating switch for welding transformer

128 - welding transformer

129 - ignitron type contactors 130 and 131, both water flow safety switches for the contactors 132 and 133, both safety thermal switches for the contactors 129.

134 - an auxiliary control supply

135 - a control for the stop and start of the return movement of the carriage, and 136 - the step by step sequence cycle control.

It will be appreciated that the precise wiring and interconnection of the elements of FIG. 10 can be varied widely within known art, these elements therefore being shown in block diagram to illustrate the interlocked functions rather than the wiring details.

I claim:

1. A welding machine comprising a base, a grating support platen on the base, a fluid actuated clamp on the base co-operating with the platen for clamping a grating thereto, an edge bar support on the base, a pair of rails fixed relative to the base but spaced therefrom, the rails being parallel to an edge of the platen, a carriage, wheels on the carriage engaging and guided for movement by the rails, power operated drive means coupled to said wheels, a welding transformer on the carriage having a pair of secondary terminals thereon, a pressure fluid actuated electrode cylinder on the carriage positioned above the plane of the platen, a first welding electrode coupled to the movable element of the electrode cylinder, a pressure fluid actuated welding head on the carriage, a horizontally movable second welding electrode, linkage means coupling the welding head to the second electrode for effecting said horizontal movement thereof upon actuation of the welding head, jumper leads interconnecting the welding electrodes to respective said secondary transformer terminals, motor control means coupled to the power operated drive means for moving the carriage between welding stations, and weld control means coupled to the transformer for controlling energising of the transformer.

2. A welding machine according to claim 1 wherein there is a plurality of said fluid actuated clamps for said clamping of the grating.

3. A welding machine according to claim 1 wherein said edge bar support comprises a support bar, a hinge interconnecting one end of the support bar to the base, and a fluid actuated cylinder coupling the support bar to the base operable to extend the support bar to an edge bar support position or to retract it from said position.

4. A welding machine according to claim 3 wherein said edge bar support further comprises a plurality of rollers on the carriage, one of said rollers being a pressure roller carried on a movable element of a pressure actuated cylinder and being operative to apply a hold down pressure on the edge bar.

5. A welding machine according to claim 1 wherein said power operated drive means comprises a hydraulic motor on the carriage, and further comprising drive transmission means coupling the motor for drive to said carriage wheels, and electric controlled solenoid valves controlling said motor.

6. A welding machine according to claim 1 further comprising a second pressure fluid actuated electrode cylinder on the carriage but positioned below said plane of the platen, a copper block on the movable element thereof aligned with said first electrode and co-operable with said first electrode to clamp the grating therebetween, and a further jumper lead coupling the copper block to the same said secondary transformer terminal as that to which said first electrode is coupled whereby said copper block is an element of said first electrode.

7. A welding machine according to claim 6 wherein said jumper lead connected to the second electrode lies in a horizontal plane, said jumper leads connected to the first electrode lie in a vertical plane and extend respectively above and below said horizontal plane of the second electrode, said second electrode jumper lead lying to one side of said vertical plane.

8. A welding machine according to claim 1 further comprising an arm, said second electrode being carried on the arm, vertically extending pivot means pivotally connecting the arm to the carriage, and a linkage interconnecting said welding head to the arm.

9. A welding machine according to claim 1 further comprising a first bell crank, said second electrode being carried on the first bell crank, a vertically extending pivot pin pivotally connecting to the first bell crank, a second bell crank, a horizontally extending pivot pin pivotally connecting the second bell crank to the carriage, a link interconnecting the bell cranks, and a thrust rod interconnecting said second bell crank and welding head.

10. A welding machine according to claim 9 further comprising an air bag pressure transmitter between the thrust rod and welding head.

11. A welding machine according to claim 1 further comprising a plurality of stop bars positioned along the base, a respective hinge connecting one end of each stop bar to the base, a respective fluid actuated cylinder coupling each stop bar to the base operable to extend the stop bar to an extended position, and an upstanding lip on each stop bar limiting movement of the grating when on the support platen thereby positioning the ends of the grating member.

12. A welding machine according to claim 11 further comprising a plurality of stop bar detectors adjacent respective stop bars, said stop bar detectors being secured to the base in such positions as to be influenced by respective said stop bars when in their extended position, said stop bar detectors being in an electrical circuit which includes carriage travel control means and being effective to inhibit forward carriage travel when the stop bars are in their extended positions.

13. A welding machine according to claim 1 further comprising a weld initiating proximity detector on the carriage positioned immediately below said plane of the platen and between the platen and the first electrode, and being in the circuit of the weld control means and operable to initiate a resistance welding cycle upon detection of a grating bar.

14. A welding machine according to claim 1 further comprising a plurality of carriage travel control proximity detectors which are evenly spaced along said base and a shoe on the carriage which, upon carriage travel, successively influences the detectors, said detectors being in an electrical circuit which also includes a selector switch and carriage travel control means, which said circuit is so arranged that upon influence of a said detector selected by the selector switch return carriage travel is terminated.

* * * * *

UNITED STATES PATENT OFFICE
CERTIFICATE OF CORRECTION

Patent No. 3,892,939　　　　　　　　Dated　July 1, 1975

Inventor(s)　Victor James Medley

It is certified that error appears in the above-identified patent and that said Letters Patent are hereby corrected as shown below:

Column 4, line 42, change "line" to -- link --

Column 4, line 57, change "f" to -- of --

Signed and Sealed this twenty-eight Day of October 1975

[SEAL]

Attest:

RUTH C. MASON　　　　　　　　　　C. MARSHALL DANN
Attesting Officer　　　　　　　　Commissioner of Patents and Trademarks